Figure 1:
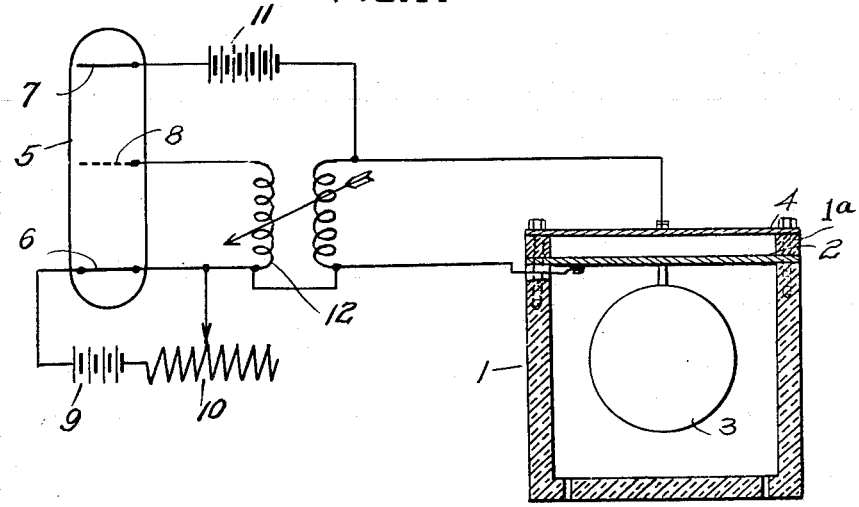

March 10, 1931.　　　R. HAMER　　　1,796,150

GRAVITY DETERMINING DEVICE

Filed March 26, 1926

WITNESSES
J. Herbert Bradley
William B. Jaspert

INVENTOR
Richard Hamer
by
Winter Brown & Critchie
his attorneys.

Patented Mar. 10, 1931

1,796,150

UNITED STATES PATENT OFFICE

RICHARD HAMER, OF PITTSBURGH, PENNSYLVANIA

GRAVITY-DETERMINING DEVICE

Application filed March 26, 1926. Serial No. 97,589.

My invention relates to apparatus for determining gravitational gradients and curvatures as effected by gravity or the gravitational force.

It is well known that the different geological strata vary in density or specific gravity independently of the qualitative features of their substance and manifests their gravitational effects on a fixed or constant given mass at the surface of the earth's crust in different intensities and in different directions. Accordingly attempts have been made to determine the nature and variation of local geological formations underground by precise measurements and observations of the direction and intensity of their gravitational effects produced at the surface. The influence then, of subsurface beds or strata is to change the local theoretical value of gravity or gravitational force. For this purpose instruments based on the principle of the torsion balance and the pendulum have been employed with varying success, the chief objection to the use of these prior art devices lies in the relatively complex and expensive construction of the instruments, their necessity for highly technical manipulation, their susceptibility to damage, or to uncontrollable disturbing conditions, or in their inefficient performance.

It is among the objects of my present invention to provide apparatus for determining the gravitational effect of subsurface formations which shall embody as elements thereof simple, more rugged, relatively inexpensive, and well known devices which shall be adapted for use by unskilled operators, and which shall be adapted for association with various forms of indicating and observing instruments which are well known in the art.

Another object of my invention is to provide apparatus of the above designated character which shall be adapted for use in determining the direction, magnitude and the direction of least curvature of gravitational gradients of a fixed mass attached or secured to the instrument being so associated therewith as to be responsive to the variations of gravity or gravitational force caused by varying altitudes, the relative positioning of the mass with other fixed bodies, and the gravitational effect of subsurface, such as rock formations, ore bodies, and the like.

Another object of my invention is to provide apparatus for determining gravitational effects which shall be embodied in such form as to make it susceptible for use for a variety of purposes, the same instrument being useful for aviation in determining the relative location of flying machines with respect to a mountain top, building, or its proximity to the ground. It may also be utilized in navigation to determine the depth of channel, the proximity of subterranean hazards, and for the location of submarines or mines, and it may also be utilized for the observation of geological conditions as hereinabove explained.

My invention contemplates the utilization of a source of constant high-frequency oscillations in an electrical circuit such as is produced by an electron tube generator of a well known type, with which I associate a fixed mass of suitable weight in such a manner that the variations of gravity or the local gravitational force acting on the fixed mass will vary the frequency of oscillations in the circuit by a change of either of the constants, namely, the inductance or capacity of the circuit with which the fixed mass is associated.

I further provide means for indicating these variations of gravity or local gravitational force which are associated with variations in the direction and magnitude of the gravitational gradients and curvatures in terms of frequency by employing a wave meter as a second source of high frequency oscillations which is loosely coupled to the first-mentioned generator and which may be adjusted to a suitable value to indicate the change in frequency of the circuit responsive to the gravitational effects.

The wave meter may be provided with a variable condenser calibrated to indicate frequency, thus obtaining a comparative value of the gravitational gradients in terms of frequency. For many purposes, however, it may be desirable to indicate the frequency as by acoustics, oscillographs, self-recording devices or the like, and in such cases, the wave meter may be utilized in connection with the apparatus to set up a beat note which is the result of the difference in the frequency of the two circuits, and this beat note may be adjusted to a suitable value and then amplified by the use of a well-known audio-frequency system connected to a loud speaker, or it may be visibly indicated by an oscillograph, or visibly indicated on a suitable electrical current measuring instrument such as a hot wire or thermo-ammeter or made to be automatically recorded on a photographic film.

Figure 2:
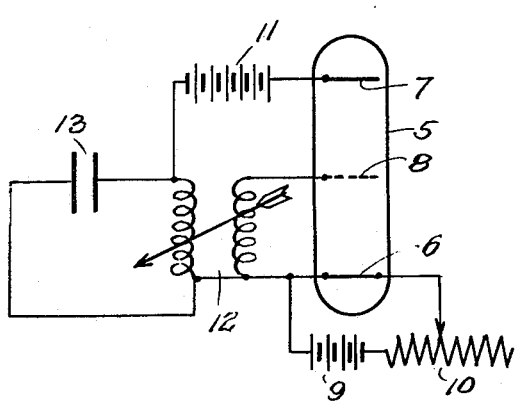
Figure 3:
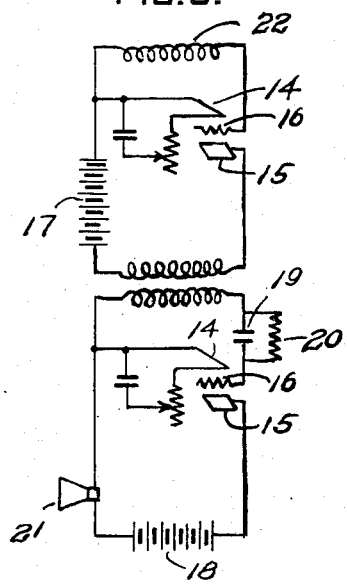
Figure 4:
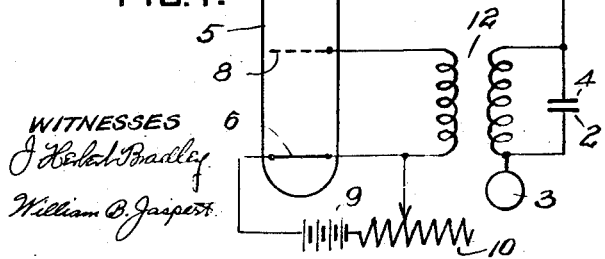

In the accompanying drawings constituting a part hereof, and in which like reference characters designate like parts, Fig. 1 is a diagrammatic view of an electron tube generator circuit having a fixed mass secured to one of the conductor plates of a condenser element in accordance with the principles of my invention; Fig. 2 is a diagrammatic view of an electron tube generator circuit having a variable condenser element which is employed as a wave meter; Fig. 3 is a wiring diagram of an amplifying system; Fig. 4 is a view corresponding to Fig. 1 in which the fixed mass is associated with the inductance coils instead of the condenser element.

Referring to Fig. 1 of the drawings I provide a casing 1 of any suitable insulating material open at one end and having mounted thereon a condenser plate 2 to which is secured a fixed mass 3. A second condenser plate 4 is provided to cooperate with the plate 2. This plate is mounted above plate 4 and firmly spaced therefrom by a precisely constructed separator 1a made of suitable insulating material. The plates 2 and 4 are connected in an electron tube generator circuit comprising a tube 5 of the pliotron, audion or oscillion type containing the following three elements, a heated filament 6 which acts as the source of electrons, a plate 7, and a grid 8, the filament 6 being connected to a battery 9 coupled to a variable resistance 10, and the plate 7 to a source of positive current such as a B-battery 11, the grid 8 being connected to a suitable inductance couple 12.

The wave meter, Fig. 2, consists of the same elements as the electron tube circuit, Fig. 1, with the exception that a variable condenser 13 is substituted for the condenser elements 2 and 4 of Fig. 1.

The circuit shown in Fig. 4 comprises an electron tube generator in which the fixed mass 3 previously described in connection with Fig. 1 is associated or connected to the inductance coil instead of the condenser element which in this instance constitutes a fixed condenser.

In Fig. 3 I have diagrammatically illustrated a well known type of amplifier circuit comprising two tubes each consisting of a heated filament 14, a plate 15, and a grid 16, having batteries 17 and 18 connected to the filament and plates respectively, and having a grid condenser 19 and resistance leak 20. A loud speaker 21 is connected in the amplifying circuit and a secondary inductance coil 22 is provided for receiving impulses induced by any of the circuits shown in Figs. 1, 2 and 3.

Referring to Figs. 1, 2 and 3 of the drawings my apparatus functions in the following manner: The electron tubes 5 are energized in the usual manner by the batteries 9 and 11 to provide a source of electrons which set up constant high-frequency oscillations in the circuit including the condenser elements 2 and 4 to which the fixed mass 3 is secured. The frequency of oscillations is kept constant by the constant flow of current in the batteries 9 and 11 but will change over a wide range of frequencies by variations in either one or both of the constants of the circuit, namely, the inductance and capacity.

In accordance with my invention any change in the weight of the fixed mass 3 due to changes in gravity or gravitational force responsive to any of the conditions hereinbefore set forth will effect a displacement of the condenser plate 2 thereby varying the air gap between the plates 2 and 4 which is the dielectric of the condenser, and consequently varies the condenser capacity and the capacity reactance of the circuit thus effecting a change in the frequency of its oscillations. It is evident that the condenser element to which the fixed mass is secured is sensitive to minute gravitational variations, and the utilization of the electron tube circuit as described permits the determination of these changes to a high degree of precision.

By coupling the wave meter, Fig. 2, to the instrument described in connection with Fig. 1, the change in frequency of the latter may be ascertained by adjusting the variable condenser 13 of the wave meter so that the frequency of the wave meter circuit corresponds to the changed frequency of the primary circuit. The variable condenser 13 may be provided with a dial having graduations in terms of frequency thus affording a direct reading of the frequency in the wave meter circuit corresponding to that of the primary circuit.

The wave meter, Fig. 2, may also be utilized to produce a beat note which is the result of a difference in frequency in the wave meter and primary circuits, and this beat note may be adjusted to a suitable value and indicated by means of the amplifying circuit, Fig. 3, or by the use of an oscillograph to audibly, visibly, or otherwise automatically indicate the value of the beat note. The beat note may be permitted to give rise to a secondary beat note by suitably adjusting the electrical constants of an additional oscillatory circuit, or this process may be repeated to produce a tertiary beat note, etc.

This method permits the employment of very high initial frequencies so that the sensitivity of the apparatus is substantially increased.

The gravity determining device as described hereinbefore may be utilized to ascertain the gravitational gradients from a given point. For such determination, assume a radio type receiving station of the character referred to is located at a given point and a gravity determining meter comprising a generating or sending unit is moved from one point to another and readings are taken at the receiving station as sent from the different points by the generating unit of the gravity meter. The recorded readings will indicate the gradient and determine the relative nearness of dense local strata, and by referring to the readings taken at the various locations the depth and location of different dense strata in the sub-surface may be determined. In the same manner the location of the relatively lightest or least dense strata may be determined.

The following is given by way of example illustrating a particular application of my invention. In view of the fact that it is well known that the gravitational effect upon a constant mass at the earth's surface varies not only with the contour of the earth's surface, but also with the density of the sub-surface, it is possible to estimate with considerable accuracy the type of earth's formations at different places under the surface. It will be readily seen therefore that my invention may be utilized for locating oil and gas fields and other mineral deposits which are found in certain well known types of earth formations. The manner in which the necessary determinations for such purpose may be made are very simple. First a gravity determining meter of the character described hereinbefore is positioned at the various points under observation and readings taken of the weight of the constant mass associated with the variable condenser at the various points. After the readings are recorded they are referred to a particular level like, say, sea level, or in other words are corrected for the altitude, and the gravitational influences of the sub-surface formations on the readings are then determined. This result would indicate the character of the earth's formation. In work of this kind a very simple device may be employed. Such a device is illustrated in Fig. 1 including merely a generating unit, a receiving or measuring unit, and a condenser having a fixed mass attached to one of the plates. The condenser may take various shapes and forms inasmuch as a suitable condenser for this purpose can be readily constructed by a person skilled in the art. The sensitiveness of the meter, however, may be improved in accordance with the skill of the maker or as described hereinbefore by increasing the frequency of the generating unit and by multiplying the comparing units in which the beats between the different units are registered.

In Fig. 4 the casing member 1 and the fixed mass 3 are associated with the inductance of the circuit and function to vary the inductance in a similar manner as its function of changing the capacity reactance when the fixed mass is secured to the condenser element, the result, namely, the change in the frequency of oscillations in the connecting circuit is the same as that described in connection with the arrangement shown in Fig. 1.

It is evident from the foregoing description of my invention that my apparatus for determining gravitational gradients and curvatures may be conveniently and inexpensively produced from a few standard elements and from the nature of its construction it can be handled with facility and utilized in the determination of gravitational gradients and curvatures as and for the purpose hereinbefore described in an efficient and expedient manner.

Although I have described several embodiments of my invention, it will be obvious to those skilled in the art that various modifications may be made in the arrangement and disposition of the several cooperating elements without departing from the principles herein set forth.

I claim:

Apparatus for determining variations in the force of gravity including a mass, means for mounting said mass for movement toward and away from the earth in response to change in said force, means for generating an alternating current of a predetermined high frequency including means for varying such frequency by the movement of said mass, and means for measuring the frequency as varied.

In testimony whereof, I sign my name.

RICHARD HAMER.